United States Patent
Qiu et al.

(10) Patent No.: US 11,915,662 B2
(45) Date of Patent: Feb. 27, 2024

(54) BACKLIGHT MODULE OF DISPLAY AND LIGHTING METHOD THEREOF

(71) Applicant: HKC CORPORATION LIMITED, Shenzhen (CN)

(72) Inventors: Bin Qiu, Shenzhen (CN); Rongrong Li, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/068,373

(22) Filed: Dec. 19, 2022

(65) Prior Publication Data

US 2023/0410757 A1    Dec. 21, 2023

(30) Foreign Application Priority Data

Jun. 16, 2022   (CN) .......................... 202210677825.1

(51) Int. Cl.
    G09G 3/34    (2006.01)
(52) U.S. Cl.
    CPC ..... *G09G 3/342* (2013.01); *G09G 2320/0626* (2013.01); *G09G 2360/145* (2013.01)
(58) Field of Classification Search
    None
    See application file for complete search history.

(56) References Cited

U.S. PATENT DOCUMENTS

| 5,926,156 A | 7/1999 | Katoh et al. | |
| 2005/0276369 A1* | 12/2005 | Mutaguchi | G09G 3/3648 377/64 |
| 2008/0137248 A1* | 6/2008 | Kim | G09G 3/3406 315/276 |

(Continued)

FOREIGN PATENT DOCUMENTS

| CN | 102144253 | 8/2011 |
| CN | 207269272 | 4/2018 |
| CN | 111369951 | 7/2020 |

(Continued)

OTHER PUBLICATIONS

CNIPA, First Office Action for CN Application No. 202210677825. 1, dated Jul. 21, 2022.

*Primary Examiner* — Amr A Awad
*Assistant Examiner* — Donna V Bocar
(74) *Attorney, Agent, or Firm* — Hodgson Russ LLP

(57) ABSTRACT

A backlight module includes at least one drive light-emitting group. The drive light-emitting group includes a drive unit provided with plurality of signal transmission channels, a plurality of light-emitting units and a plurality of line groups. The signal transmission channel is connected to the light-emitting unit through the line group. The signal transmission channel, the line group and the light-emitting unit are arranged in one-to-one correspondence. The line group includes a main transmission line and a compensation line arranged in parallel. The compensation lines of the plurality of line groups are connected through a control switch group. When there is an abnormal signal transmission channel, the control switch group is enabled to control a compensation line corresponding to the abnormal signal transmission channel to be conducted with compensation line corresponding to at least one normal signal transmission channel.

13 Claims, 7 Drawing Sheets

(56) References Cited

U.S. PATENT DOCUMENTS

2011/0273491 A1    11/2011    Iida et al.

FOREIGN PATENT DOCUMENTS

| CN | 113487988  | 10/2021 |
| CN | 113671752  | 11/2021 |
| EP | 1037492    | 9/2000  |
| JP | H0653944   | 2/1994  |
| WO | 2022054779 | 3/2022  |

* cited by examiner

BACKLIGHT MODULE OF DISPLAY AND LIGHTING METHOD THEREOF

CROSS-REFERENCE TO RELATED APPLICATION

This application claims priority to Chinese Patent Application No. 202210677825.1, filed Jun. 16, 2022, the entire disclosure of which is incorporated herein by reference.

FIELD OF TECHNOLOGY

The application relates to the technical field of display, in particular to a backlight module and a lighting method thereof.

BACKGROUND

The backlight area in the backlight module is controlled by modules, each module area corresponds to a driver chip, each driver chip has a plurality of signal transmission channels, and each signal transmission channel is connected to a group of lamp strings. The signal transmission channel is used for controlling the current of each group of lamp strings, and each group of lamp strings is composed of a plurality of light-emitting diodes in series. For the existing design, each module area is controlled separately. For some lamp strings, if the channel is damaged or short-circuited, a driver chip corresponding to the module area will be directly protected, then all the lamp strings in the corresponding module area will go out at this time, and a dark area will appear in the backlight area of the backlight module, resulting in abnormal display.

The above information disclosed in the Background is only for enhancement of understanding of the background of the present application and therefore it may include information that does not constitute prior art known to a person of ordinary skill in the art.

SUMMARY

There are provided a backlight module and a lighting method thereof according to embodiments of the present application. The technical solution is as below:

According to a first aspect of the present application, there is provided a backlight module. The backlight module includes at least one drive light-emitting group. The drive light-emitting group including a drive unit provided with a plurality of signal transmission channels, a plurality of light-emitting units and a plurality of line groups. The signal transmission channel is connected to the light-emitting unit through the line group. The signal transmission channel, the line group and the light-emitting unit are arranged in one-to-one correspondence. The line group includes a main transmission line and a compensation line arranged in parallel. Compensation lines of the plurality of line groups are connected through a control switch group. When one of the plurality of signal transmission channels is abnormal, the control switch group is enabled to control a compensation line corresponding to the abnormal signal transmission channel to be conducted with a compensation line corresponding to at least one normal signal transmission channel in the plurality of signal transmission channels.

According to a second aspect of the present application, there is provided a lighting method for a backlight module. The backlight module includes at least one drive light-emitting group, the drive light-emitting group including a drive unit, a plurality of light-emitting units and a plurality of line groups. The drive unit is provided with a plurality of signal transmission channels, the signal transmission channel is connected to the light-emitting unit through the line group, the signal transmission channel, the line group and the light-emitting unit are arranged in one-to-one correspondence. The line group includes a main transmission line and a compensation line arranged in parallel, and compensation lines of the plurality of line groups are connected through a control switch group. The lighting method of the backlight module includes:

detecting an abnormal signal transmission channel of the signal transmission channel in the drive unit; and controlling the control switch group to allow a compensation line corresponding to the abnormal signal transmission channel to be conducted with a compensation line corresponding to at least one normal signal transmission channel in the plurality of signal transmission channels.

It should be understood that the above general description and the following detailed description are exemplary only and are not limiting to the present application.

BRIEF DESCRIPTION OF THE DRAWINGS

The above and other objects, features and advantages of the present application will become more apparent by describing exemplary embodiments thereof in detail with reference to the accompanying drawings.

DETAILED DESCRIPTION OF THE EMBODIMENTS

Figure 1:
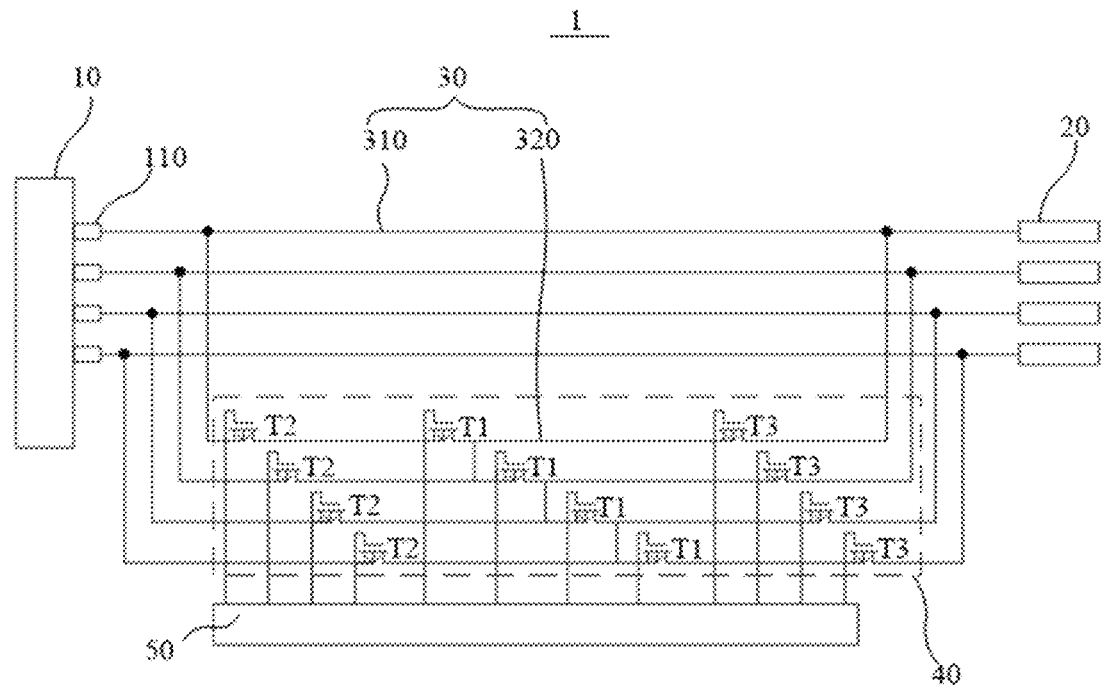
FIG. 1 is a connection schematic diagram of a drive light-emitting group of a first embodiment of the present application.

Although the present application can readily be embodied in different forms of embodiment, however, only some of the specific embodiments are shown in the drawings and will be described in detail in the description, while it is understood that the description is to be regarded as an exemplary illustration of the principles of the present application and is not intended to limit the present application to those described herein.

Thus, one feature pointed out in the description is intended to illustrate one of the features of one embodiment of the present application and is not intended to imply that each embodiment of the present application must possess the illustrated feature. In addition, it should be noted that many features are described in the description. Although certain features may be combined to illustrate a possible system design, these features may also be used for other unspecified combinations. Therefore, unless otherwise stated, the illustrated combinations are not intended to be limiting.

In the embodiments illustrated in the drawings, indications of direction (such as up, down, left, right, front and back) are used to explain that the structure and movement of the various elements of the present application are not absolute but relative. These descriptions are appropriate when these elements are in the positions shown in the drawings. If the description of the positions of the element changes, the indications of the directions change accordingly.

Exemplary embodiments will now be described more comprehensively with reference to the accompanying drawings. However, the exemplary embodiments can be implemented in a variety of forms and should not be construed as being limited to the examples set forth herein. Rather, these exemplary embodiments are provided so that the description of the present application will be more comprehensive and complete, and the concept of exemplary embodiments will be fully connected to those skilled in the art. The accompanying drawings are only schematic illustrations of the present application and are not necessarily drawn to scale. Like reference signs in the drawings denote identical or similar parts and thus repetitive descriptions thereof will be omitted.

The preferred embodiments of the present application are further elaborated below in conjunction with the accompanying drawings of the description.

Embodiment 1

Referring to FIG. 1, the present application provides a backlight module. The backlight module in the present application adopts Mini-LED (Mini Light Emitting Diode). The Mini-LED adopts straight-down type design with small spacing of lamp beads, and achieves dimming in a smaller range through a large number of dense beads. Compared with the traditional backlight design, Mini-LED can have better brightness uniformity and higher color contrast in a smaller light mixing distance, and can achieve ultra-thin design of terminal products and save electric energy.

The backlight module includes at least one drive light-emitting group 1. The drive light-emitting group 1 includes a drive unit 10, a plurality of light-emitting units 20 and a plurality of line groups 30. The drive unit 10 is provided with a plurality of signal transmission channels 110, the signal transmission channels 110 are connected to the light-emitting units 20 through the line groups 30, and the signal transmission channel 110, the line group 30 and the light-emitting unit 20 are arranged in one-to-one correspondence. The line groups 30 include a main transmission line 310 and a compensation line 320 arranged in parallel.

The light-emitting unit 20 can be understood as a lamp string that is a plurality of LED lamps are sequentially connected in series. The drive unit 10 can be understood as a driver chip, and the driver chip is provided with a plurality of signal transmission channels 110. Once the signal transmission channels 110 are damaged, the whole driver chip will start protection, and the whole chip will not work, resulting in all the light-emitting units 20 corresponding to the driver chip not working. However, the maintenance of the driver chip is difficult, which may lead to the scrapping of the whole backlight module.

For this purpose, the compensation lines 320 of the plurality of line groups are connected by a control switch group 40. The control switch group 40 can control the compensation line 320 corresponding to the abnormal signal transmission channel 110 to be conducted with the compensation line 320 corresponding to at least one normal signal transmission channel 110 of the plurality of signal transmission channels 110 when one of the plurality of signal transmission channels 110 is abnormal. After the signal transmission channel 110 is damaged, the two compensation lines 320 are connected by the switch group, so that the compensation line 320 corresponding to the damaged signal transmission channel 110 is connected to the other compensation lines 320, and the current transmitted to the light-emitting unit 20 can flow through the signal transmission channels 110 corresponding to other compensation lines 320 to avoid the damaged signal transmission channel 110. It is also understood that the abnormal signal transmission channel 110 is replaced by other signal transmission channels 110. Current that lights up the light-emitting unit corresponding to the abnormal signal transmission channel 110 may flow through other normal signal transmission channels 110.

In the technical solution of the present application, a light-emitting unit 20 is provided corresponding to the signal transmission channel 110 of each drive unit 10. The line group 30 includes a main transmission line 310 and a compensation line 320 arranged in parallel. If the signal transmission channel 110 is damaged and the current cannot be continuously transmitted, the signal transmission channel 110 is abnormal. A compensation line 320 corresponding to an abnormal signal transmission channel 110 is conducted with a compensation line 320 corresponding to a normal signal transmission channel 110 by a control switch group 40. In this way, the abnormal signal transmission channel 110 is replaced with other normal signal transmission channels 110. The current flows through the normal signal transmission channel 110, passing through the compensation line 320 corresponding to the normal signal transmission channel 110 and the compensation line 320 corresponding to the abnormal signal transmission channel 110 sequentially, and flowing to the light-emitting unit 20 corresponding to the abnormal signal transmission channel 110 to light up the light-emitting unit 20. In this way, when the signal transmission channel 110 of the driver chip is damaged, the corresponding light-emitting unit 20 can still be lightened, so as to ensure the normal operation of the driver chip, reduce the occurrence of backlight dark area and make the backlight module work normally.

In order to effectively control each compensation line 320 to function at a desired time, the control switch group 40 includes a plurality of first control switches T1. The first control switch T1 is connected in series with the compensation line 320 in one-to-one correspondence. A first terminal of the first control switch T1 is connected to the signal transmission channel 110, a second terminal of the first control switch T1 is connected to the light-emitting unit 20, and a control terminal of the first control switch T1 is in response to a control signal so that the first terminal of the first control switch T1 and the second terminal of the first control switch T1 are turned on or off. In adjacent two compensation lines 320, the second terminal of the first control switch T1 on one of the two compensation lines 320 is connected to the first terminal of the first control switch T1 on another one of the two compensation lines 320. By turning off the first control switch T1, the compensation line 320 is enabled to play a compensatory replacement role when necessary.

Figure 2:
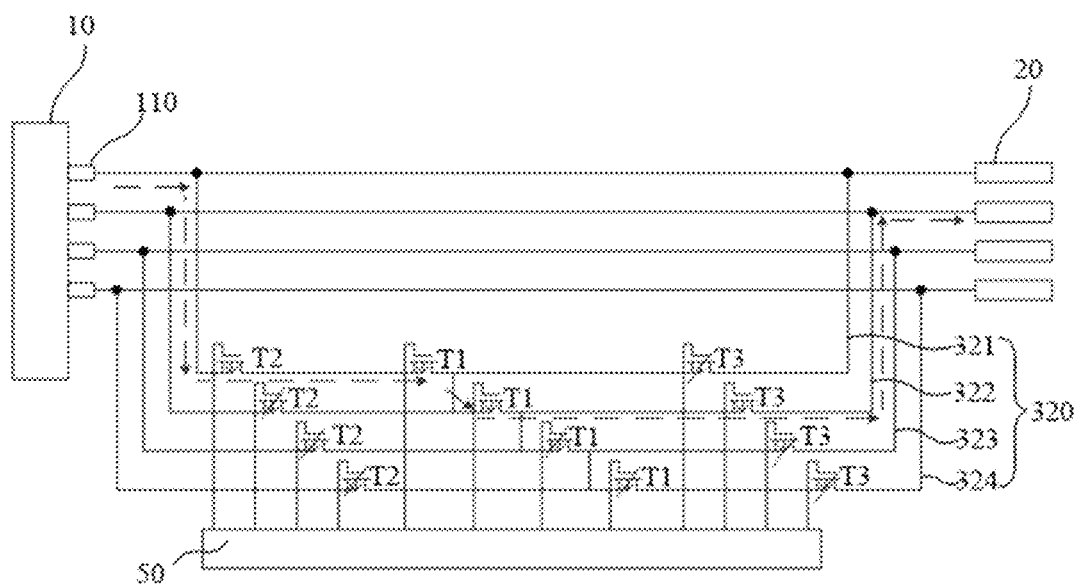
FIG. 2 is a schematic diagram of connection of two adjacent compensation lines in FIG. 1 in the present application.

Referring to FIG. 2, when there is an abnormality in the signal transmission channel 110, the first control switch T1 on the compensation line 320 on the abnormal signal transmission channel 110 is closed, and the first control switch T1 on the compensation line 320 in the normal signal transmission channel 110 is also closed. Thus, the connection of two compensation lines 320 is achieved, and the compensation line 320 intervenes to carry out the replacement work. By connecting the second terminal of the first control switch T1 on one compensation line 320 with the first terminal of the first control switch T1 on another compensation line 320, a connecting line of adjacent two compensation lines 320 can be positioned between adjacent two first control switches T1. When the compensation line 320 is turned on or off, the corresponding first control switch T1 can play a control role.

An adjacent signal transmission channel 110 may be used as an alternative channel, and when an abnormality occurs in one of the signal transmission channels 110, the compensation line 320 of the closest signal transmission channel 110 is connected, and current may flow through the closest compensation line 320, thereby reducing the path through which the current flows and reducing the loss of the current.

In order to further ensure that any one of the compensation lines 320 can be connected to the other compensation lines 320. The first control switch T1 is provided in any adjacent two compensation lines 320 so that one signal transmission channel 110 can be replaced by another arbitrary signal transmission channel 110. The first control switch T1 between the two signal transmission channels 110 needs to be turned on. Between the damaged signal transmission channel 110 and the replacement signal transmission channel 110, by means of a partial line of a compensation line 320 between them, the current thus lighting up the damaged signal transmission channel 110 flows through the replaced signal transmission channel 110 and flows through the compensation line 320 to the light-emitting unit 20 of the damaged signal transmission channel 110.

The first control switch T1 is a MOS transistor (Metal-Oxide-Semiconductor Field-Effect Transistor), the source of the first control switch T1 is the first terminal, the drain of the first control switch T1 is the second terminal, and the gate of the first control switch T1 is the control terminal. It can also be understood that the source of the first control switch T1 is the second terminal, and the drain of the first control switch T1 is the first terminal.

In one aspect of the present application, the control switch group 40 further includes a plurality of second control switches T2 and a plurality of third control switches T3, and each compensation line 320 is correspondingly connected in series with one of the second control switches T2 and one of the third control switches T3. On each compensation line 320, a first terminal of the second control switch T2 is connected to signal transmission channel 110, a second terminal of the second control switch T2 is connected to the first terminal of the first control switch T1, the second terminal of the first control switch T1 is connected to a first terminal of the third control switch T3, and a second terminal of the third control switch T3 is connected to the light-emitting unit 20. Control terminals of the first control switch T1, the second control switch T2 and the third control switch T3 are respectively configured for controlling the first terminal and second terminal of the first control switch T1, the second control switch T2 and the third control switch T3 to turn on or off, respectively while in response to the control signal. The control terminal of the control switch generally refers to the gate of the transistor. The control terminal receives a high-level signal, and the first terminal and the second terminal are turned on. The control terminal receives a low-level signal, and the first terminal and the second terminal are turned off.

There are two cases here, as shown in FIG. 2, in the first case, when the abnormal signal transmission channel 110 is adjacent to the normal signal transmission channel 110, and the first control switch T1 of the two compensation lines 320 is opened, the second control switch T2 on the compensation line 320 of the abnormal signal transmission channel 110 is opened, and the third control switch T3 is closed. Thus, the current flows through the signal transmission channel 110 to the light-emitting unit 20 corresponding to the abnormal signal transmission channel 110, and the current flows unidirectionally without shunting.

Figure 3:
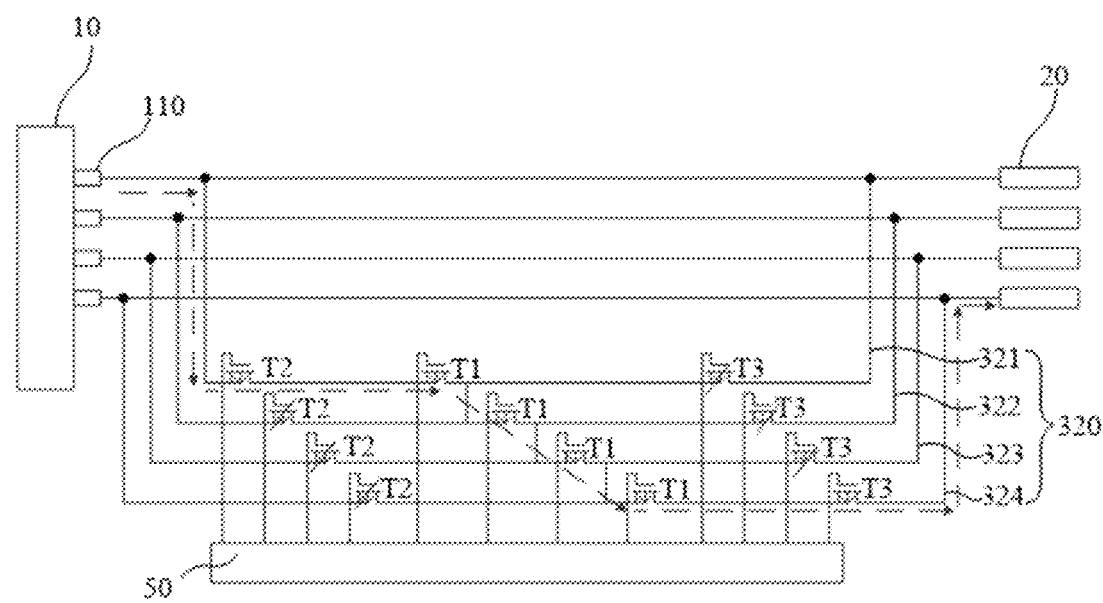
FIG. 3 is a schematic diagram of connection of two spaced compensation lines in FIG. 1 in the present application.

Referring to FIG. 3, in the second case, there are other channels spaced between the abnormal signal transmission channel 110 and the normal signal transmission channel 110. When the first control switches T1 of the two compensation lines 320 are closed, the first control switched T1 corresponding to the compensation lines 320 between the abnormal signal transmission channel 110 and the normal signal transmission channel 110 also need to be closed. Also, both the second control switches T2 and the third control switches T3 between the compensation lines 320 of the abnormal signal transmission channel 110 and the normal signal transmission channel 110 are turned off to prevent the current in the other signal transmission channel 110 from affecting the current in the compensation line 320. Only a partial compensation line 320 between the abnormal signal transmission channel 110 and the normal signal transmission channel 110 is used for transmitting current. The dotted arrows in FIGS. 2 and 3 show the current flow directions.

For example, the arrow direction of the dotted line in the figure indicates the current flow direction. The drive unit 10 is provided with four signal transmission channels 110, and each of the four signal transmission channels 110 is connected to a compensation line 320. The compensation line 320 includes a first line 321, a second line 322, a third line 323, and a fourth line 324. The first line 321, the second line 322, the third line 323 and the fourth line 324 are arranged in order from top to bottom. For example, the signal transmission channel 110 corresponding to the first line 321 is damaged and cannot continue to transmit current. At this time, the signal transmission channel 110 corresponding to the fourth line 324 can be used as an alternative channel. Thus, the first control switches T1 on the first line 321 and the fourth line 324 are both closed, and the first control switches T1 on the second line 322 and the third line 323 are also closed, and current flows through parts of the second line 322 and the third line 323.

In order to prevent the current in the signal transmission channels 110 corresponding to the second line 322 and the third line 323 from affecting the current in the compensation line 320, both the second control switch T2 and the third control switch T3 on the second line 322 and the third line 323 are turned off. Thus, one end of the second line 322 is disconnected from the corresponding signal transmission channel 110, and the other end of the second line 322 is disconnected from the corresponding light-emitting unit 20.

Likewise, one end of the third line 323 is disconnected from the corresponding signal transmission channel 110, and the other end of the third line 323 is also disconnected from the corresponding light-emitting unit 20. Both terminals of the second line 322 and the third line 323 are disconnected from the outside world.

In order to ensure that the light-emitting unit 20 of the first line 321 can be lightened, the current is transmitted through the signal transmission channel 110 of the fourth line 324, and the current reaches the first line 321 through the fourth line 324, the third line 323 and the second line 322 in turn. The current flows through the first line 321 to the corresponding light-emitting unit 20. Further, in order to avoid shunting of the current flowing to the light-emitting unit 20, the second control switch T2 on the first line 321 is opened, and the third control switch T3 is closed. Thus, when the current flows to the first line 321, only one direction is connected, that is, the current can only flow to the light-emitting unit 20 corresponding to the first line 321, and no shunt occurs.

In the above manner, when there are abnormal signal transmission channels in the drive unit, when any of the transmission channels is an idle channel, the compensation line can be connected by the control switch group 40.

It should also be noted that, at this time, the second line 322 and the corresponding signal transmission channel 110 are disconnected, and the third line 323 and the corresponding signal transmission channel 110 are also disconnected. The signal transmission channel 110 corresponding to the second line 322 and the signal transmission channel 110 corresponding to the third line 323 can be used normally.

Figure 4:
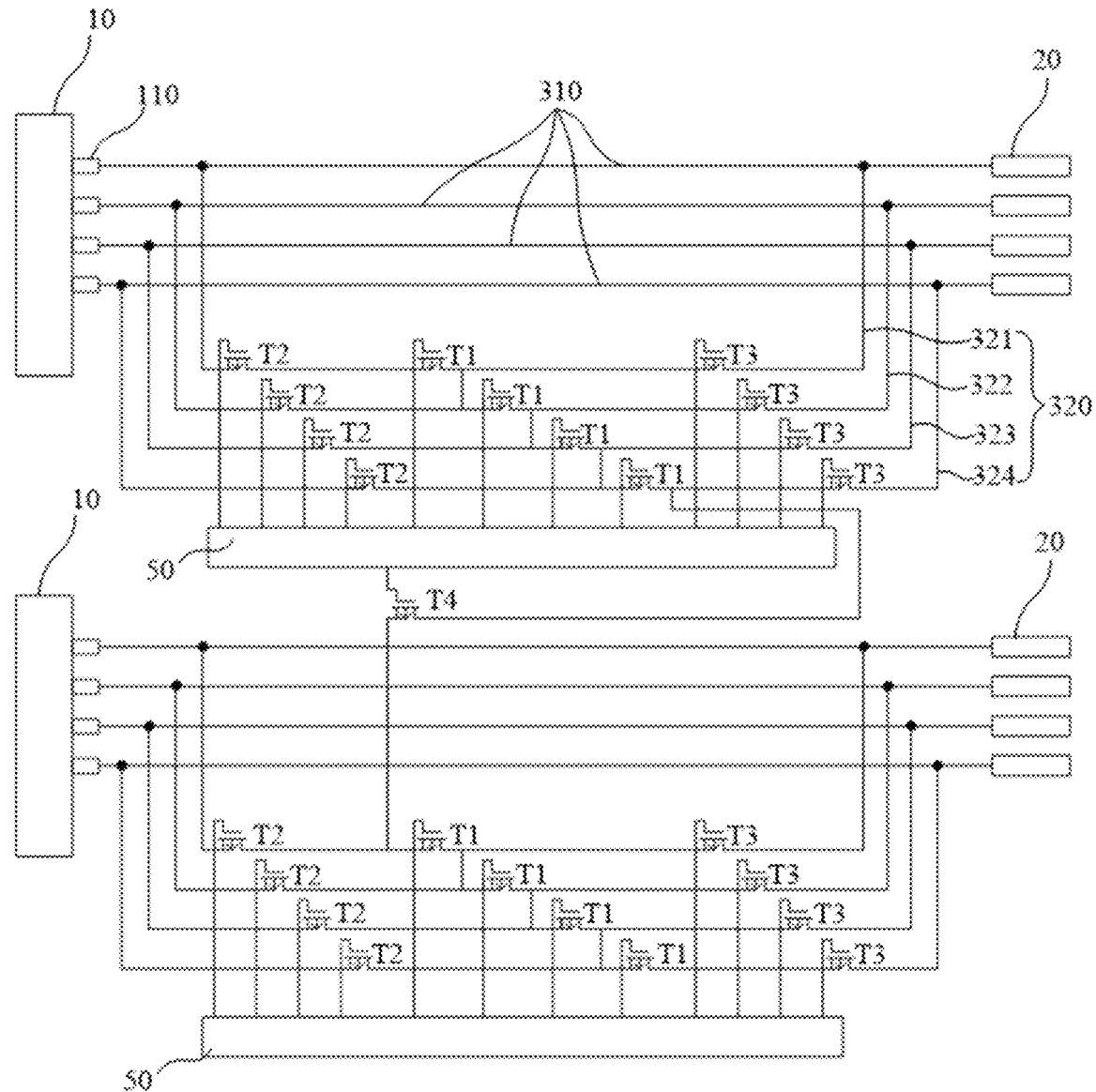
FIG. 4 is a schematic diagram of connection of two drive light-emitting groups in the present application.

Referring to FIG. 4, the other signal transmission channels 110 of the drive unit 10 are utilized in a case where the other signal transmission channels 110 are idle, and it may sometimes occur that the other signal transmission channels 110 are all in operation. To this end, in each drive unit 10, N compensation lines 320 are provided sequentially, and the second terminal of the first control switch T1 in the n-th compensation line 320 is connected to the first terminal of the first control switch T1 in the (n+1)-th compensation line 320, where 1<n<N, N≥2, and n and N are positive integers. The drive light-emitting group 1 is provided with at least two groups. In the at least two groups, the second terminal of the first control switch T1 on the N-th compensation line 320 of one of the at least two groups is connected to the first terminal of the first control switch T1 on the first compensation line 320 of the other one of the at least two groups.

Thus, it is possible to transfer the current signal using the drive unit 10 of the other drive light-emitting group 1. The first compensation line 320 of the other drive light-emitting group 1 is used as the (N+1)-th compensation line 320 of the previous drive light-emitting group 1 when using the drive unit 10 of the other drive light-emitting group 1. In this way, the abnormal signal transmission channel 110 can be replaced by an idle signal transmission channel 110 of the current drive unit 10 or other drive units 10, and the compensation lines 320 of the two are connected, and the current is output to the light-emitting unit 20 of the damaged channel through the idle signal transmission channel 110.

In one aspect, in order to effectively control the connection of two drive units the control switch group 40 further includes a fourth control switch T4. A first terminal of the fourth control switch T4 is connected to the second terminal of the first control switch T1 in the N-th compensation line 320 of the drive light-emitting group 1, and the second terminal of the fourth control switch T4 is connected to the first terminal of the first control switch T1 on the first compensation line 320 of the other drive light-emitting group 1.

By using the drive unit 10 in the other drive light-emitting group 1, the fourth control switch T4 is controlled to be closed, and the connection of two drive light-emitting groups 1 is completed. The backlight module also includes a control unit 50. The control unit 50 is configured for outputting control signals, and a control terminal of each control switch is connected to the control unit 50. The control terminal of the control switch is the gate of the transistor switch, and the control unit inputs a control level to the gate of the transistor switch. Generally, a high level denotes turn-on and a low level denotes turn-off. Alternatively, the high level denotes turn-off and the low level denotes turn-on. ON means that the first and second terminals of the control switch are turned on. Therefore, the control switch can be an N-type transistor or a P-type transistor.

Figure 5:
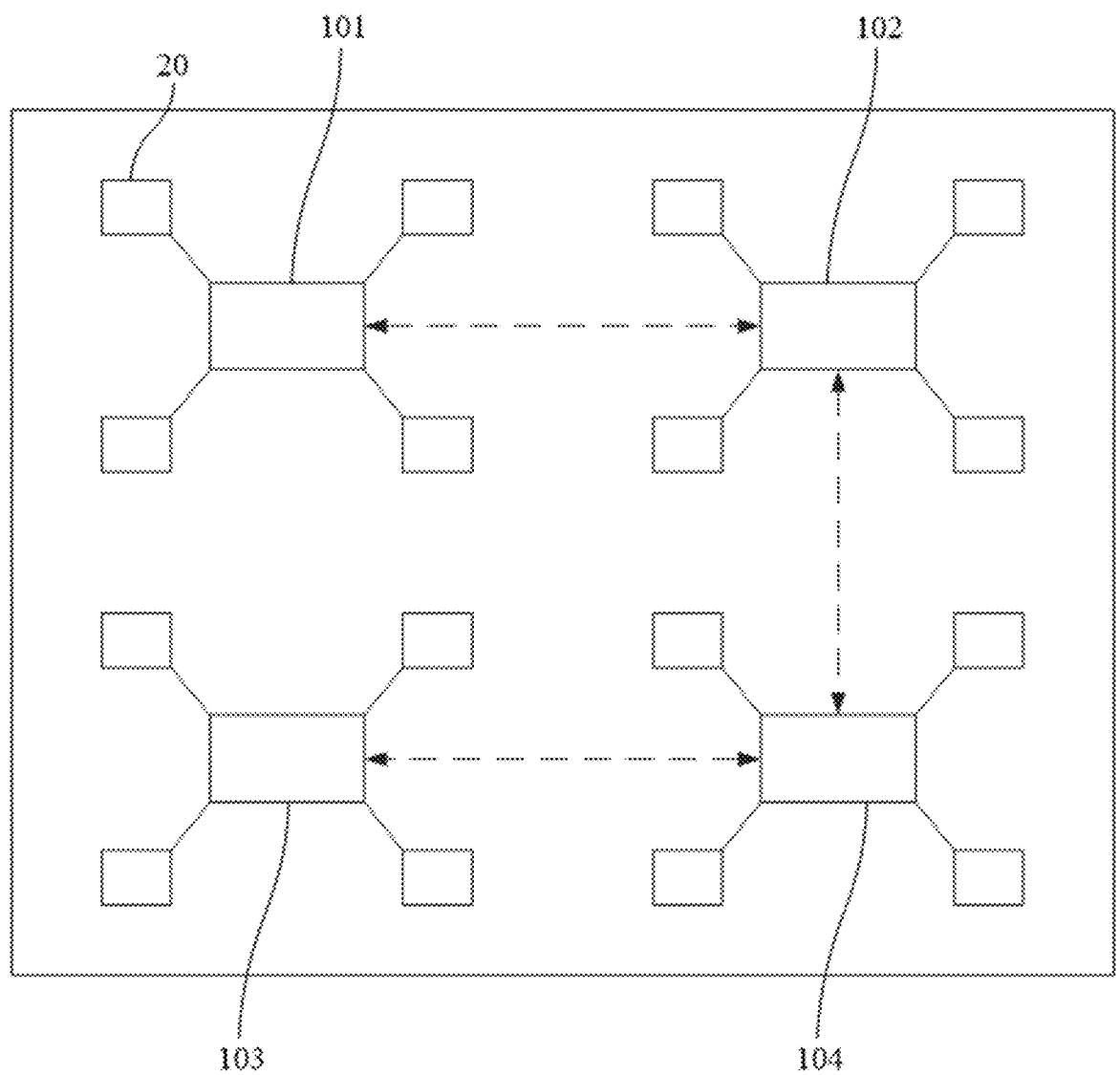
FIG. 5 is a schematic diagram of a first connection mode in which a plurality of drive light-emitting groups are connected.
Figure 6:
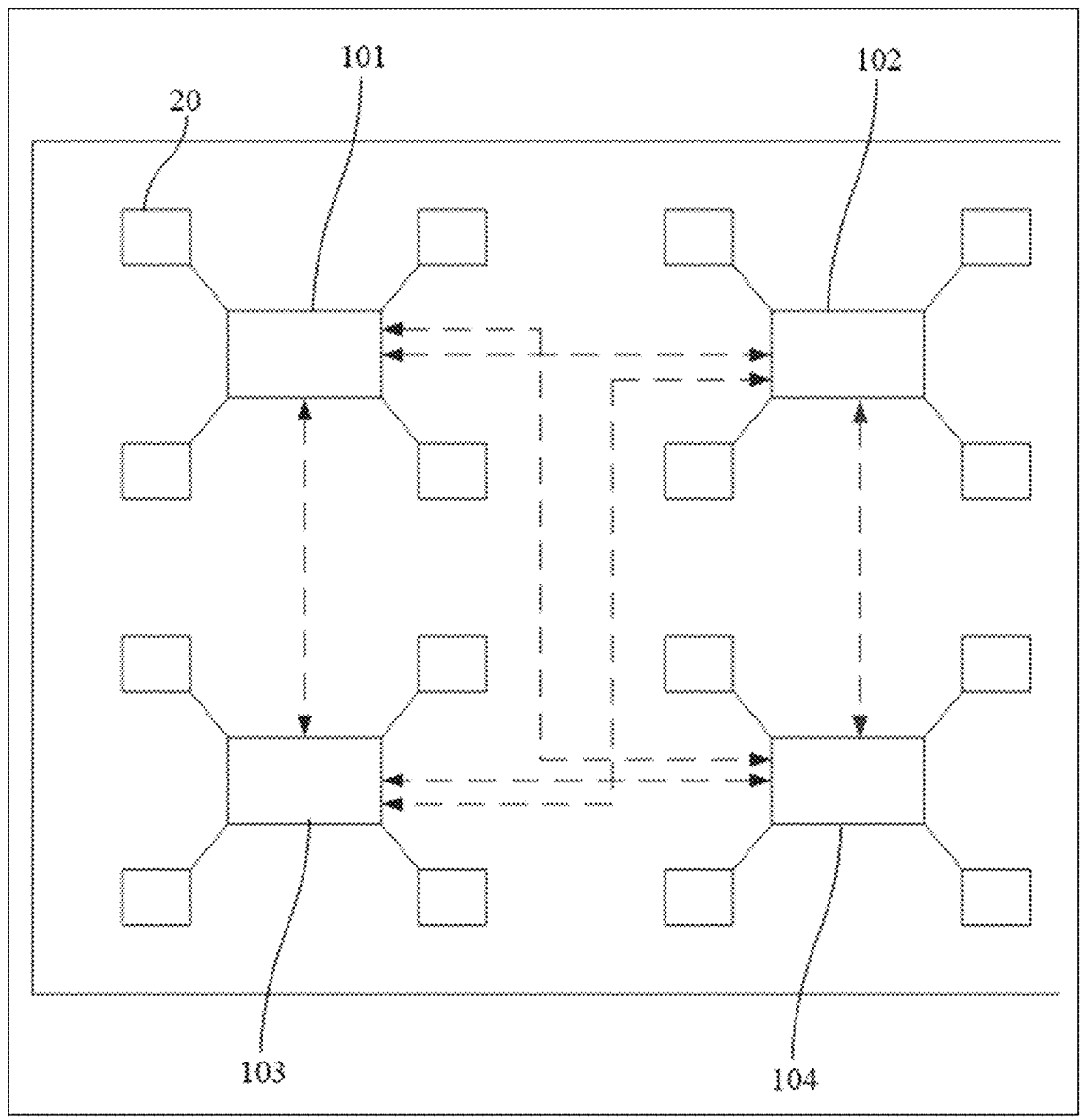
FIG. 6 is a schematic diagram of a second connection mode in which a plurality of drive light-emitting groups are connected.

Referring to FIG. 5 and FIG. 6, the drive unit 10 is connected in at least two ways. For example, four drive units 10, namely, a first unit 101, a second unit 102, a third unit 103 and a fourth unit 104 are provided in the backlight module. The drive unit 10 can be understood as a driver chip. Each drive unit 10 is provided and connected with a plurality of light-emitting units 20.

In a first connection mode, the first unit 101, the second unit 102, the third unit 103 and the fourth unit 104 are connected in sequence, and the fourth control switch T4 is provided on the connection line.

The second connection mode, every two drive units 10 are connected to each other, that is, the first unit 101 is connected to the second unit 102, the third unit 103 and the fourth unit 104; the second unit 102 is connected to the first unit 101, the third unit 103 and the fourth unit 104; the third unit 103 is connected to the first unit 101, the second unit 102 and the fourth unit 104; the fourth unit 104 is connected to the first unit 101, the second unit 102 and the third unit 103; and the fourth control switch T4 is provided on the line to which each unit is connected.

Embodiment 2

The present application also provides a lighting method for a backlight module. The backlight module includes at least one drive light-emitting group. The drive light-emitting group includes a drive unit, a plurality of light-emitting units and a plurality of line groups. The drive unit is provided with a plurality of signal transmission channels. The signal transmission channel is connected to the light-emitting unit through the line group. The signal transmission channel, the line group and the light-emitting unit are arranged in one-to-one correspondence. The line group includes a main transmission line and a compensation line arranged in parallel, and compensation lines of the plurality of line groups are connected through a control switch group.

Figure 7:
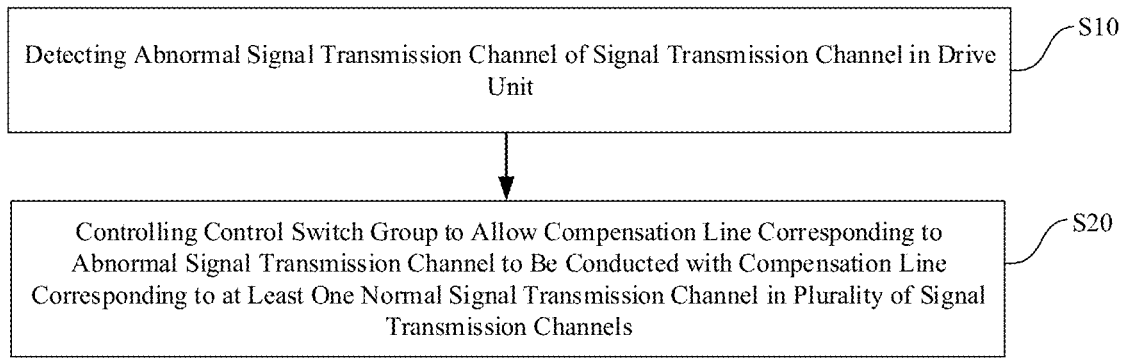
FIG. 7 is a flow diagram of a lighting method of a backlight module according to a second embodiment of the present application.

Referring to FIG. 7, the lighting method of the backlight module includes:

Step S10, an abnormal signal transmission channel of the signal transmission channel in the drive unit is detected. The main function of the signal transmission channel is to transmit the current signal supplied to the light-emitting unit for lighting. By detecting whether there is current flowing in each signal transmission channel under normal conditions, the current flowing channel is determined as a normal channel without damage. If there is no current flowing in the signal transmission channel, the signal transmission channel is determined as an abnormal channel, and it can be determined that the channel has been damaged, that is, this is an abnormal signal transmission channel.

Specifically, it is possible to input the current into the drive unit and detect whether or not the current passes through each signal transmission channel, the signal transmission channel without a current passing through is determined as an abnormal channel, and the signal transmission channel with a current passing through is determined as a normal signal transmission channel.

Step S20, the control switch group is controlled to allow a compensation line corresponding to the abnormal signal transmission channel to be conducted with a compensation line corresponding to at least one idle channel in the plurality of signal transmission channels. The abnormal signal transmission channel is damaged, resulting in that the current cannot be transmitted. In order to ensure that the light-emitting unit corresponding to the signal transmission channel can be lightened, the current is transmitted through other signal transmission channels, and after the compensation lines of the other signal transmission channels and the compensation lines corresponding to the abnormal channels are turned on, the compensation lines of the other signal transmission channels and the compensation lines corresponding to the signal transmission channels are connected. The current that should be transmitted through the signal transmission channel is transmitted through other normal signal transmission channels, bypasses the signal transmission channel through the compensation line, and is outputted to the corresponding light-emitting unit, so as to achieve the lighting of the light-emitting unit of the signal transmission channel.

Figure 8:
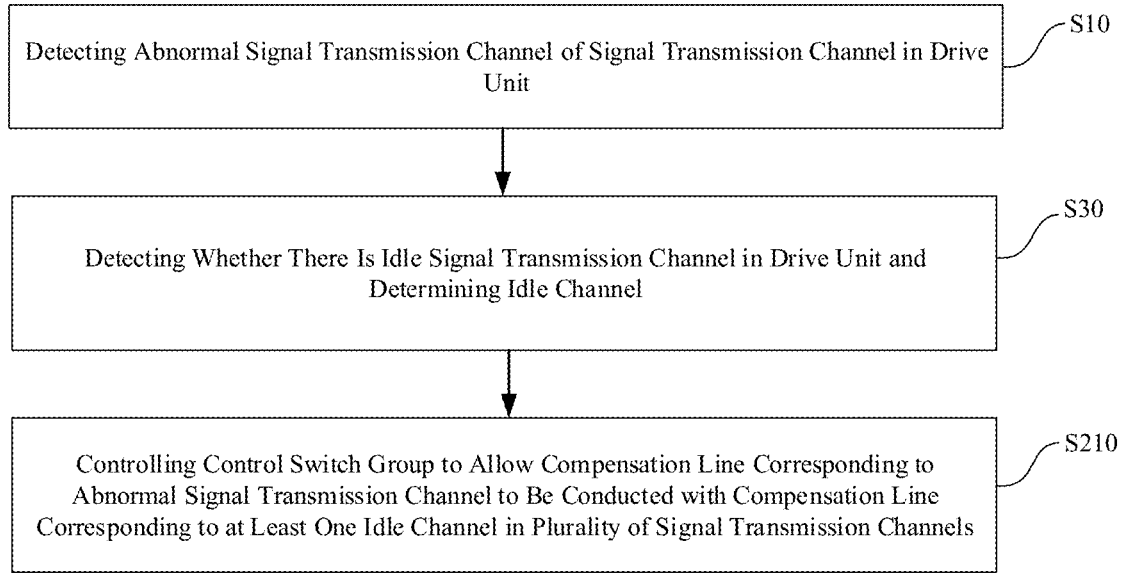
FIG. 8 is a flow diagram of adding step S30 in FIG. 7 of the present application.

Referring to FIG. 8, in order to avoid the use of other signal transmission channels affecting the normal operation of the drive unit, after the step of detecting an abnormal signal transmission channel of the signal transmission channel in the drive unit, the method includes:

Step S30, whether there is an idle signal transmission channel in the drive unit is detected, and an idle channel is determined. To ensure that other signal transmission channels are available prior to using other signal transmission channels. Specifically, whether there is the current flowing in other signal transmission channels is detected while the drive unit is operating. A signal transmission channel with current flowing is determined to be the signal transmission channel in operation. If there is no current flowing in the signal transmission channel, it indicates that this channel is idle and determined as an idle channel.

The step of controlling the control switch group to allow a compensation line corresponding to the abnormal signal transmission channel to be conducted with a compensation line corresponding to at least one normal signal transmission channel in the plurality of signal transmission channels includes:

Step S210, the control switch group is controlled to allow a compensation line corresponding to the abnormal signal transmission channel to be conducted with a compensation line corresponding to at least one idle channel in the plurality of signal transmission channels.

In determining the idle channel, there may be a plurality of idle channels in the drive unit, and at this time, the idle channel closest to the abnormal signal transmission channel is selected. In this way, the two compensation lines are connected by the shortest path, which can improve the transmission time and the efficiency of current delivery.

After the idle channel is determined, the idle channel can be fully utilized, and the abnormal signal transmission channel can be replaced by the idle channel. This will not affect other signal transmission channels in working states, but also make full use of the functions of the drive unit itself.

In one aspect of the present application, the control switch group includes a plurality of first control switches, a plurality of second control switches and a plurality of third control switches. The first control switch, the second control switch and the third control switch are correspondingly connected in series on each of the compensation lines. On each of the compensation lines: a first terminal of the second control switch is connected to the signal transmission channel, a second terminal of the second control switch is connected to the first terminal of the first control switch, a second terminal of the first control switch is connected to a first terminal of the third control switch, and a second terminal of the third control switch is connected to the light-emitting unit. Control terminals of the first control switch, the second control switch and the third control switch are respectively configured for controlling the first terminal and the second terminal of each of the first control switch, the second control switch and the third control switch to turn on or off in response to the control signal.

Figure 9:
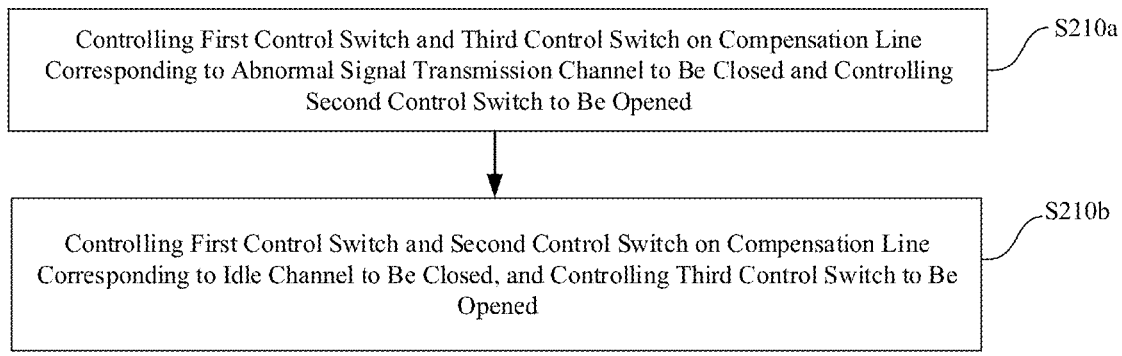
FIG. 9 is a detailed flow diagram of step S210 in FIG. 8 of the present application.

Referring to FIG. 9, when the abnormal signal transmission channel is adjacent to the idle channel, in order to ensure that the corresponding two compensation lines can be turned on more smoothly and shunt will not occur, the step of controlling the control switch group to allow a compensation line corresponding to the abnormal signal transmission channel to be conducted with a compensation line corresponding to at least one idle channel in the plurality of signal transmission channels includes:

Step S210a, the first control switch and the third control switch on the compensation line corresponding to the abnormal signal transmission channel are controlled to be closed and the second control switch is controlled to be opened.

In step S210b, the first control switch and the second control switch on the compensation line corresponding to the idle channel are controlled to be closed, and the third control switch is controlled to be opened.

For example, the drive unit is provided with four signal transmission channels. Each of the four signal transmission channels is connected to one compensation line, and the compensation line includes a first line, a second line, a third line and a fourth line. The first line, the second line, the third line and the fourth line are arranged in sequence from top to bottom. For example, if the signal transmission channel corresponding to the second line is damaged and cannot continue to transmit current, in this case, the signal transmission channel that is an idle channel corresponding to the first line serves as an alternative channel.

Thus, both the first control switch and the third control switch in the second line are closed and the second control switch is opened. The second control switch is opened, the abnormal signal transmission channel and the second line is disconnected, and the corresponding main transmission line and the second line are also disconnected, so that when the current flows to the second line, part of the current will not flow to the main transmission line of the second line.

The first control switch and the second control switch on the first line are also closed, and the normal signal transmission channel corresponding to the first line is used to transmit current. In addition, the third control switch in the first line is opened, and the first line and the corresponding light-emitting unit are disconnected as the third control switch is opened, so that the current flowing through the first line only flows to the light-emitting unit corresponding to the second line, but does not flow to the light-emitting unit corresponding to the first line. When two adjacent compensation lines are connected, the control switches on the other compensation lines are closed.

Figure 10:
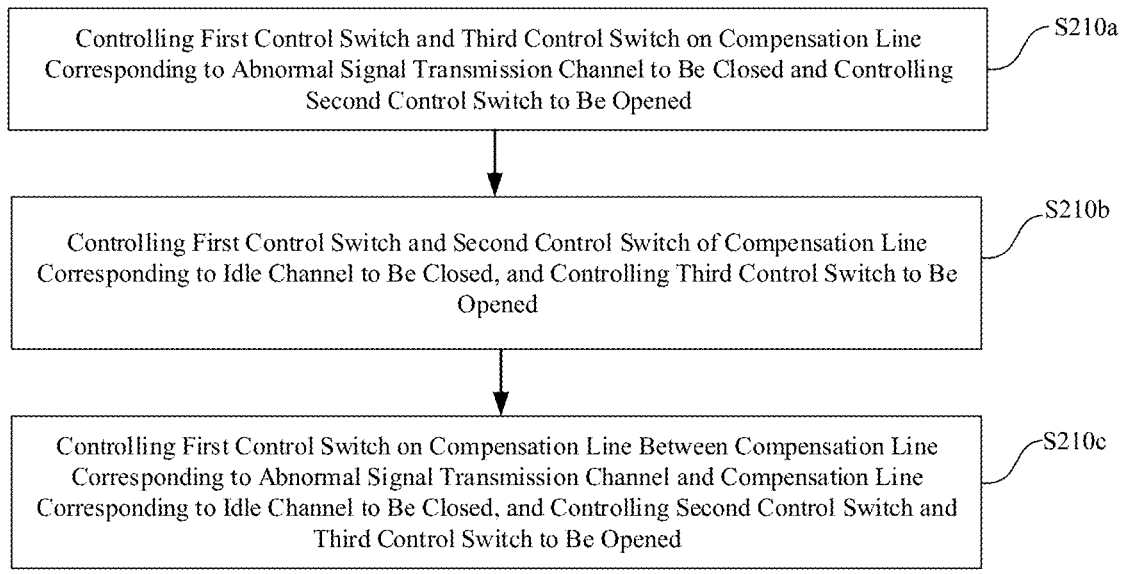
FIG. 10 is a flow diagram of adding step S210C in FIG. 9 of the present application.

Referring to FIG. 10, further, when the abnormal signal transmission channel is spaced from the idle channel, if the two channels are spaced from the other channels, it is necessary to transmit the signal using the path formed by the parts of compensation lines between them. Also, in order to reduce mutual interference with other normal signals, the controlling the control switch group to allow a compensation line corresponding to the abnormal signal transmission channel to be conducted with a compensation line corresponding to at least one idle channel in the plurality of signal transmission channels further includes:

Step S210c, a first control switch on a compensation line between the compensation line corresponding to the abnormal signal transmission channel and the compensation line corresponding to the idle channel is controlled to be closed, and the second control switch and the third control switch are controlled to be opened.

For further example, if the signal transmission channel corresponding to the fourth line is damaged and cannot continue to transmit current, in this case, the signal transmission channel corresponding to the first line can be used as the alternative channel. Thus, the first control switches in the first line and the fourth line are both closed, and the first control switches in the second line and the third line are also closed, and current flows through parts of the second line and the third line.

In order to prevent the current in the signal transmission channels corresponding to the second line and the third line from affecting the current in the compensation line, both the second control switches and the third control switches on the second line and the third line are turned off. Thus, one end of the second line is disconnected from the corresponding signal transmission channel, and the other end of the second line is disconnected from the corresponding light-emitting unit. Likewise, one end of the third line is disconnected from the corresponding signal transmission channel, and the other end of the third line is also disconnected from the corresponding light-emitting unit. Both terminals of the second line and the third line are disconnected from the outside world. No current is transmitted to it from the outside, and no current is transmitted from the inside to the outside.

It should be noted that the control switch can be turned on when the high level is received and turned off when the low level is received. Alternatively, the control switch can be turned off when the high level is received and turned on when the low level is received.

In particular, if the signal transmission channel corresponding to the first line is abnormal, it can be replaced with the signal transmission channel corresponding to the fourth line, and the first control switch of the first line may not be opened when the corresponding compensation line is connected.

Sometimes there are cases where there are no idle channels in this drive unit, and the idle channels in other drive units are required for conduction. Specifically of the present application, the control switch group further includes a fourth control switch, a first terminal of the fourth control switch is connected to the second terminal of the first control switch on the N-th compensation line of the drive light-emitting group, and a second terminal of the fourth control switch is connected to the first terminal of the first control switch on the first compensation line of the drive light-emitting group, where $N \geq 2$. It can also be understood that the first compensation line of another drive light-emitting group is the (N+1)-th compensation line of the previous drive light-emitting group.

Figure 11:
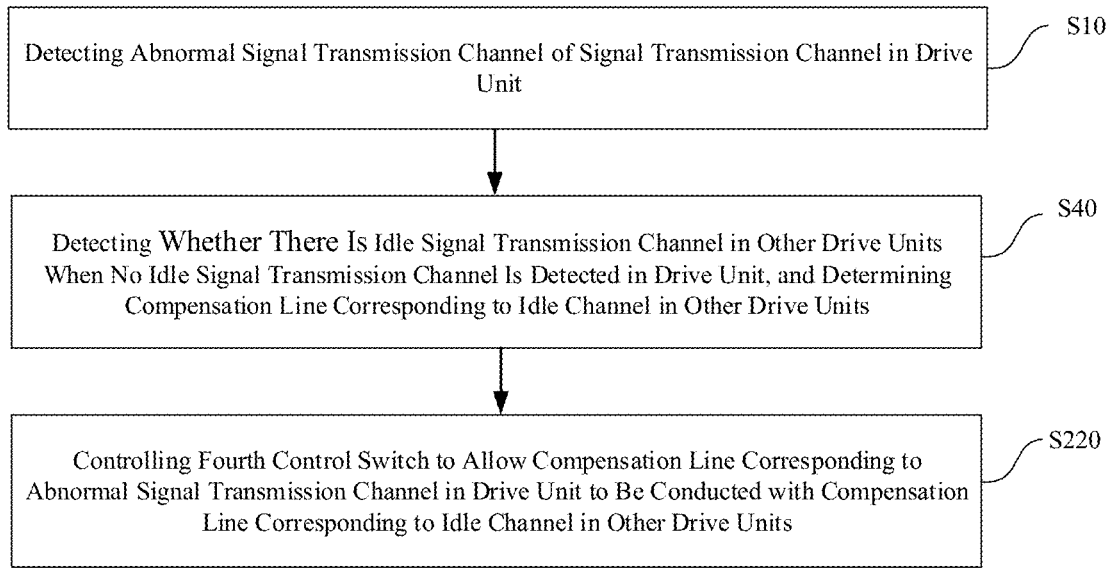
FIG. 11 is a flow diagram of performing connection by using compensation lines of other drive units in FIG. 7 of the present application.

Referring to FIG. 11, the step of detecting an abnormal signal transmission channel of the signal transmission channel in the drive unit further includes:

Step S40, whether there is an idleness signal transmission channel in other drive units is detected when no idle signal transmission channel is detected in the drive unit, and the compensation line corresponding to the idle channel in other drive units is determined.

The step of controlling the control switch group to allow a compensation line corresponding to the abnormal signal transmission channel to be conducted with a compensation line corresponding to at least one normal signal transmission channel in the plurality of signal transmission channels further includes:

Step S220, the fourth control switch to allow the compensation line corresponding to the abnormal signal transmission channel in the drive unit is controlled to be conducted with the compensation line corresponding to the idle channel in the other drive units. Thus, it is possible to transfer the current signal using the drive units in other drive light-emitting groups. By using the drive units in other drive light-emitting groups, the fourth control switch is controlled to be closed, and the connection of two drive light-emitting groups is completed. The first compensation line of the other drive light-emitting group is used as the (N+1)-th compensation line of the previous drive light-emitting group. In this way, the damaged signal transmission channel can be replaced with an idle signal transmission channel of the current drive unit or other drive units, and the compensation lines of the two are connected to output the current to the light-emitting unit corresponding to the abnormal signal transmission channel through the idle signal transmission channel.

In the above embodiment, the lighting method of the backlight module further includes: comparing a current value that enables the light-emitting unit of the abnormal channel to be lightened with a preset current value when there is no idle channel in the signal transmission channels of all the drive units.

When the current value of the light-emitting unit of the abnormal signal transmission channel is less than or equal to the preset current value, the compensation line corresponding to the signal transmission channel closest to the signal transmission channel is controlled to be connected to the compensation line of the abnormal signal transmission channel, and the current of the closest signal transmission channel is shunted to the light-emitting unit corresponding to the abnormal channel. When the current value supplied to the light-emitting unit is less than the preset current value, indicating that the brightness requirement of the light-emitting unit is not high, the brightness is low. By shunting a part of the current of other light-emitting units to the light-emitting units corresponding to the abnormal signal transmission channel, the light-emitting units corresponding to the abnormal signal transmission channel can be guaranteed to be lightened, and obvious dark areas will not appear in the backlight area.

When the current value of the light-emitting unit of the abnormal signal transmission channel is larger than the preset current value, the signal transmission channel of the light-emitting unit at the edge position of the backlight module is selected, and the compensation line corresponding to the signal transmission channel of the light-emitting unit at the edge position of the backlight module is controlled to be connected to the compensation line of the abnormal signal transmission channel. When the current value supplied to the light-emitting unit is larger than the preset current value, the brightness requirement of the light-emitting unit is high. In this way, the current of the light-emitting unit at the edge position of the backlight module can be transferred to the light-emitting unit corresponding to the abnormal signal transmission channel. Choosing the edge position of the backlight module will not affect the overall display effect of the backlight module, and the edge position is easily overlooked.

While the present application has been described with reference to several exemplary embodiments, it should be understood that the terms used herein are illustrative and exemplary and are not limiting. Since the present application can be embodied in various forms without departing from the spirit or essence of the application, it should therefore be understood that the foregoing embodiments are not limited to any of the foregoing details, but are to be interpreted broadly within the spirit and scope defined by the appended claims, so that all variations and modifications falling within the scope of the claims or their equivalents are to be covered by the appended claims.

What is claimed is:

1. A backlight module comprising:
   at least one drive light-emitting group, comprising:
      a drive unit provided with a plurality of signal transmission channels;
      a plurality of light-emitting units; and
      a plurality of line groups, wherein each signal transmission channel is connected to one light-emitting unit through a corresponding line group, and the signal transmission channel, the line group and the light-emitting unit are arranged in one-to-one correspondence, wherein the line group comprises a main transmission line and a compensation line arranged in parallel;
   wherein compensation lines of the plurality of line groups are connected through a control switch group, when one of the plurality of signal transmission channels is abnormal, the control switch group is enabled to control a compensation line corresponding to an abnormal signal transmission channel to be conducted with a compensation line corresponding to at least one normal signal transmission channel in the plurality of signal transmission channels;
   wherein the control switch group comprises a plurality of first control switches, and the first control switch is connected in series with the compensation line in one-to-one correspondence, wherein a first terminal of the first control switch is connected to the signal transmission channel, a second terminal of the first control switch is connected to the light-emitting unit, a control terminal of the first control switch is turned on or off in response to a control signal and enables the first terminal of the first control switch and the second terminal of the first control switch to be turned on or off;
   wherein in adjacent two compensation lines, the second terminal of the first control switch on one of the adjacent two compensation lines is connected to the first terminal of the first control switch on another one of the adjacent two compensation lines;
   wherein the control switch group further comprises a plurality of second control switches and a plurality of third control switches, and each compensation line is correspondingly connected in series with one of the second control switches and one of the third control switches;
   wherein on each of the compensation lines, a first terminal of the second control switch is connected to the signal transmission channel, a second terminal of the second control switch is connected to the first terminal of the first control switch, the second terminal of the first control switch is connected to a first terminal of the third control switch, and a second terminal of the third control switch is connected to the light-emitting unit; and
   wherein control terminals of the first control switch, the second control switch and the third control switch are respectively configured for controlling the first terminal and the second terminal of each of the first control switch, the second control switch and the third control switch to be turned on or off in response to the corresponding control signal.

2. The backlight module according to claim 1, wherein the backlight module further comprises a control unit configured for outputting control signals, and the control terminal of each of the first control switch, the second control switch and the third control switch is connected to the control unit.

3. The backlight module according to claim 1, wherein in each of the drive units, N compensation lines are arranged in sequence, the second terminal of the first control switch on an n-th compensation line is connected to the first terminal of the first control switch on an (n+1)-th compensation line, wherein, $1 \leq n < N$, $N \geq 2$, and n and N are positive integers; and
   wherein at least two groups of drive light-emitting groups are provided, wherein in the at least two groups of drive light-emitting groups, the second terminal of the first control switch on an N-th compensation line of one of the at least two groups is connected to the first terminal of the first control switch on the first compensation line of another of the at least two groups.

4. The backlight module according to claim 3, wherein the at least two groups of drive light-emitting groups are connected in sequence.

5. The backlight module according to claim 3, wherein each of the at least two groups of drive light-emitting groups is connected to each of the remaining of the at least two groups of drive light-emitting groups.

6. The backlight module according to claim 3, wherein the control switch group further comprises a fourth control switch, wherein a first terminal of the fourth control switch is connected to the second terminal of the first control switch on the N-th compensation line of the drive light-emitting group, and a second terminal of the fourth control switch is connected to the first terminal of the first control switch on the first compensation line of the drive light-emitting group.

7. The backlight module according to claim 1, wherein the first control switch, the second control switch and the third control switch are MOS transistors.

8. A lighting method of a backlight module, wherein the backlight module comprises at least one drive light-emitting group, the drive light-emitting group comprising a drive unit, a plurality of light-emitting units and a plurality of line groups, wherein the drive unit is provided with a plurality of signal transmission channels, each signal transmission channel is connected to one light-emitting unit through a corresponding line group, and the signal transmission channel, the line group and the light-emitting unit are arranged in one-to-one correspondence, wherein the line group comprising a main transmission line and a compensation line arranged in parallel, and compensation lines of the plurality of line groups are connected through a control switch group;

the lighting method of the backlight module comprises:
detecting an abnormal signal transmission channel of the signal transmission channel in the drive unit; and
controlling the control switch group to allow a compensation line corresponding to the abnormal signal transmission channel to be conducted with a compensation line corresponding to at least one normal signal transmission channel in the plurality of signal transmission channels;
wherein after detecting the abnormal signal transmission channel of the signal transmission channel in the drive unit, the method further comprises:
detecting whether there is an idle signal transmission channel in the drive unit and determining an idle channel;
wherein controlling the control switch group to allow the compensation line corresponding to the abnormal signal transmission channel to be conducted with the compensation line corresponding to at least one normal signal transmission channel in the plurality of signal transmission channels comprises:
controlling the control switch group to allow the compensation line corresponding to the abnormal signal transmission channel to be conducted with a compensation line corresponding to the idle channel in the plurality of signal transmission channels.

9. The lighting method of the backlight module according to claim 8, wherein the control switch group comprises a plurality of first control switches, a plurality of second control switches and a plurality of third control switches, wherein the first control switch, the second control switch and the third control switch are correspondingly connected in series on each of the compensation lines, wherein on each of the compensation lines: a first terminal of the second control switch is connected to the signal transmission channel, a second terminal of the second control switch is connected to the first terminal of the first control switch, a second terminal of the first control switch is connected to a first terminal of the third control switch, a second terminal of the third control switch is connected to the light-emitting unit, and control terminals of the first control switch, the second control switch and the third control switch are respectively configured for controlling the first terminal and the second terminal of each of the first control switch, the second control switch and the third control switch to be turned on or off in response to the corresponding control signal; and
when the abnormal signal transmission channel is adjacent to the idle channel, controlling the control switch group to allow the compensation line corresponding to the abnormal signal transmission channel to be conducted with a compensation line corresponding to at least one normal signal transmission channel in the plurality of signal transmission channels comprises:
controlling the first control switch and the third control switch on the compensation line corresponding to the abnormal signal transmission channel to be closed and controlling the second control switch to be opened; and
controlling the first control switch and the second control switch on the compensation line corresponding to the idle channel to be closed, and controlling the third control switch to be opened.

10. The lighting method of the backlight module according to claim 9, wherein when the abnormal signal transmission channel is spaced from the idle channel, controlling the control switch group to allow the compensation line corresponding to the abnormal signal transmission channel to be conducted with the compensation line corresponding to at least one idle channel in the plurality of signal transmission channels further comprises:
controlling a first control switch on a compensation line between the compensation line corresponding to the abnormal signal transmission channel and the compensation line corresponding to the idle channel to be closed, and controlling the second control switch and the third control switch to be opened.

11. The lighting method of the backlight module according to claim 8, wherein the control switch group further comprises a fourth control switch, a first terminal of the fourth control switch is connected to the second terminal of the first control switch on an N-th compensation line of the drive light-emitting group, and a second terminal of the fourth control switch is connected to the first terminal of the first control switch on the first compensation line of the another drive light-emitting group, where N≥2;
after the detecting the abnormal signal transmission channel of the signal transmission channel in the drive unit, the method further comprises:
detecting whether there is an idle signal transmission channel in other drive units when no idle signal transmission channel is detected in the drive unit, and determining the compensation line corresponding to the idle channel in other drive units; and
wherein controlling the control switch group to allow the compensation line corresponding to the abnormal signal transmission channel to be conducted with the compensation line corresponding to at least one normal signal transmission channel in the plurality of signal transmission channels further comprises:
controlling the fourth control switch to allow the compensation line corresponding to the abnormal signal transmission channel in the drive unit to be conducted with the compensation line corresponding to the idle channel in the other drive units.

12. The lighting method of the backlight module according to claim 11, wherein the drive unit and the other drive units are connected in sequence.

13. The lighting method of the backlight module according to claim 8, further comprising:
comparing a current value that enables the light-emitting unit corresponding to the abnormal signal transmission channel to be lightened with a preset current value when there is no idle channel in the signal transmission channels of all the drive units;
controlling a compensation line corresponding to a signal transmission channel closest to the signal transmission channel to be connected to the compensation line of the abnormal signal transmission channel, when the current value of the light-emitting unit corresponding to the abnormal signal transmission channel is less than or equal to the preset current value, wherein a current of the closest signal transmission channel is shunted to the light-emitting unit corresponding to the abnormal signal transmission channel; and
controlling the compensation line corresponding to the signal transmission channel of the light-emitting unit at a edge position of the backlight module to be connected to the compensation line corresponding to the abnormal signal transmission channel, when the current value of the light-emitting unit corresponding to the abnormal signal transmission channel is larger than the preset current value.

\* \* \* \* \*